United States Patent
Heinrich et al.

(10) Patent No.: US 8,958,390 B2
(45) Date of Patent: Feb. 17, 2015

(54) REFERENCE CLOCK CALIBRATION

(71) Applicant: Nvidia Corporation, Santa Clara, CA (US)

(72) Inventors: Greg Heinrich, Nice (FR); Frederic Bossy, Sunnyvale, CA (US)

(73) Assignee: Nvidia Corporation, Santa Clara, CA (US)

( * ) Notice: Subject to any disclaimer, the term of this patent is extended or adjusted under 35 U.S.C. 154(b) by 222 days.

(21) Appl. No.: 13/629,838

(22) Filed: Sep. 28, 2012

(65) Prior Publication Data

US 2014/0044096 A1    Feb. 13, 2014

(30) Foreign Application Priority Data

Aug. 9, 2012    (GB) .................................. 1214254.3

(51) Int. Cl.
    *H04W 4/00*    (2009.01)
(52) U.S. Cl.
    USPC .......................................................... 370/331
(58) Field of Classification Search
    CPC .................................................. H04W 80/04
    USPC .................................. 370/331, 335; 455/456
    See application file for complete search history.

(56) References Cited

U.S. PATENT DOCUMENTS

| | | | |
|---|---|---|---|
| 6,122,506 | A | 9/2000 | Lau et al. |
| 6,363,123 | B1* | 3/2002 | Balodis .......................... 375/316 |
| 7,454,634 | B1* | 11/2008 | Donovan et al. .............. 713/322 |
| 7,920,527 | B2* | 4/2011 | Rakshani et al. ............. 370/335 |
| 8,219,142 | B2 | 7/2012 | Khairmode et al. |
| 2003/0104823 | A1* | 6/2003 | Ono ............................... 455/456 |
| 2009/0054075 | A1* | 2/2009 | Boejer et al. ................ 455/456.1 |
| 2009/0088085 | A1* | 4/2009 | Nilsson et al. .................. 455/76 |
| 2009/0197639 | A1* | 8/2009 | Khairmode et al. ........ 455/553.1 |
| 2009/0274202 | A1* | 11/2009 | Hanke et al. ................... 375/220 |
| 2011/0087449 | A1* | 4/2011 | Haartsen et al. ................ 702/89 |
| 2011/0274221 | A1* | 11/2011 | Yang et al. ..................... 375/344 |
| 2014/0003542 | A1* | 1/2014 | Zukerman et al. ............. 375/259 |

FOREIGN PATENT DOCUMENTS

| | | |
|---|---|---|
| EP | 1229409 A2 | 8/2002 |
| WO | 2012112573 A1 | 8/2012 |

OTHER PUBLICATIONS

GB Combined Search and Examination Report dated Nov. 30, 2012, Application No. GB1214254.3, 7 pages.
Foreign Communication From a Related Counterpart Application, GB Application No. 10 2013 013 196.0; GB Official Action dated Oct. 14, 2014, 7 pages.

* cited by examiner

*Primary Examiner* — Chirag Shah
*Assistant Examiner* — Jael Ulysse

(57) ABSTRACT

An apparatus comprising: a first transceiver arranged to communicate over a wireless network, the first transceiver comprising a first clock; and a second transceiver arranged to communicate other than by said wireless network, the second transceiver comprising a second clock. The second sends a request signal to the first transceiver. In response, the first transceiver transitions from a first mode to a second mode and provides to the second transceiver a response signal for calibrating the second clock relative to the first clock. In the first mode the first transceiver performs zero or more calibrations of the first clock relative to the wireless network, and in the second mode the first transceiver performs at least one additional calibration of the first clock relative to the wireless network, the response signal being based on the at least one additional calibration.

27 Claims, 2 Drawing Sheets

REFERENCE CLOCK CALIBRATION

CROSS REFERENCE TO RELATED APPLICATION

This application claims the benefit of GB patent application No. 1214254.3, entitled "Reference Clock Calibration," filed on Aug. 9, 2012. The above-listed application is commonly assigned with the disclosure and is incorporated herein by reference as if reproduced herein in its entirety.

TECHNICAL FIELD

The disclosure relates to calibrating a clock of a transceiver such as a satellite positioning subsystem, short range or ad hoc wireless subsystem, or other subsystem.

BACKGROUND

Mobile phones and similar devices often feature several wireless subsystems such as Bluetooth, Wifi and/or GPS, as well as the cellular subsystem (a.k.a. baseband). Each wireless subsystem depends on a stable local reference clock to synchronize and communicate with peers, satellites or the network infrastructure.

On a typical design, the cellular subsystem and the wireless group comprising Bluetooth, GPS and Wifi subsystems both derive their reference clock from their own crystal oscillator. These oscillators normally deliver a reference clock that is close to perfect but temperature variations, aging and other factors cause fluctuations that require some kind of adjustment scheme to meet application-specific accuracy constraints. Adjustment is usually done by matching the local reference clock against a known clock that is inferred from the wireless signal received by the respective subsystem. It takes some effort (in terms of time and/or power) to adjust the reference clock and therefore any way to speed this process up is beneficial to the system.

SUMMARY

According to one aspect of the disclosure there is provided an apparatus. In one embodiment the apparatus includes: a first transceiver arranged to communicate over a wireless network, the first transceiver comprising a first clock; and a second transceiver arranged to communicate other than by said wireless network, the second transceiver comprising a second clock; wherein the second transceiver is configured to send a request signal to the first transceiver; the first transceiver is configured, in response to the request signal, to transition from a first mode to a second mode and provide to the second transceiver a response signal for calibrating the second clock relative to the first clock, wherein in the first mode the first transceiver performs zero or more calibrations of the first clock relative to the wireless network, and in the second mode the first transceiver performs at least one additional calibration of the first clock relative to the wireless network, the response signal being based on the at least one additional calibration; and the second transceiver is configured to calibrate the second clock based on the response signal.

According to another aspect of the disclosure, there is provided a method of operating an apparatus comprising a first transceiver arranged to communicate over a wireless network and a second transceiver arranged to communicate other than by said wireless network, the first transceiver comprising a first clock and the second transceiver comprising a second clock. In one embodiment, the method includes: sending a request signal from the second transceiver to the first transceiver; in response to the request signal, transitioning the first transceiver from a first mode to a second mode and providing from the first transceiver to the second transceiver a response signal for calibrating the second clock relative to the first clock, wherein in the first mode the first transceiver performs zero or more calibrations of the first clock relative to the wireless network, and in the second mode the first transceiver performs at least one additional calibration of the first clock relative to the wireless network, the response signal being based on the at least one additional calibration; and calibrating the second clock based on the response signal.

According to another aspect of the disclosure, there is provided a computer program product for operating an apparatus comprising a first transceiver arranged to communicate over a wireless network and a second transceiver arranged to communicate other than by said wireless network, the first transceiver comprising a first clock and the second transceiver comprising a second clock; the computer program product being embodied on a non-transitory computer readable storage and configured so as when executed on one or more execution units of said apparatus to perform operations. In one embodiment, the operations include: sending a request signal from the second transceiver to the first transceiver; in response to the request signal, transitioning the first transceiver from a first mode to a second mode and providing from the first transceiver to the second transceiver a response signal for calibrating the second clock relative to the first clock, wherein in the first mode the first transceiver performs zero or more calibrations of the first clock relative to the wireless network, and in the second mode the first transceiver performs at least one additional calibration of the first clock relative to the wireless network, the response signal being based on the at least one additional calibration; and calibrating the second clock based on the response signal.

BRIEF DESCRIPTION OF THE DRAWINGS

For a better understanding of the disclosure and to show how it may be put into effect, reference is made by way of example to the accompanying drawings in which.

DETAILED DESCRIPTION

Figure 1:
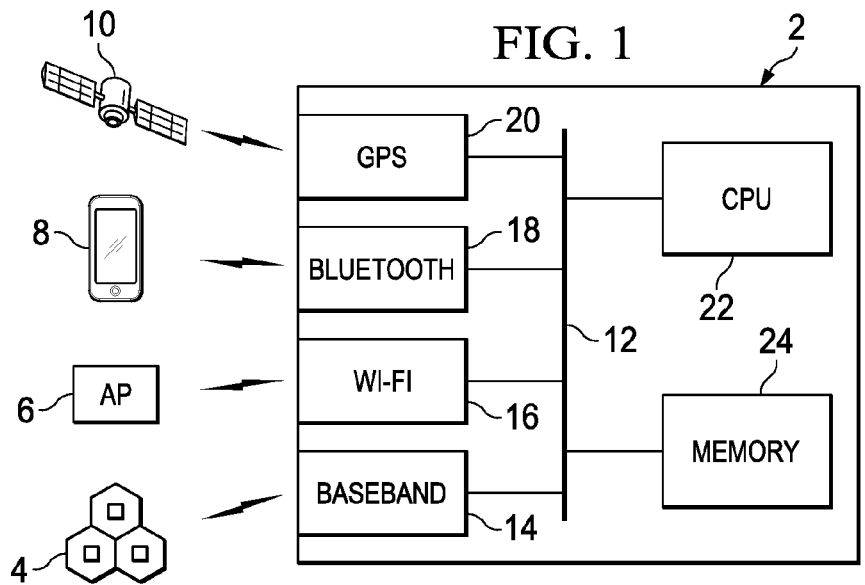
FIG. 1 is a schematic illustration of an embodiment of a communication system.

An alternative to each wireless subsystem performing its own self-contained calibration is for one of the subsystems, e.g. the cellular subsystem, to provide frequency information to one or more other of the wireless subsystems. For example the GPS chip may use a baseband-provided reference clock to calibrate its own crystal. For this to work efficiently the baseband reference clock needs a suitable accuracy (depending on the particular application or design in question).

Also, while the cellular subsystem (baseband) is normally continuously adjusting its own reference clock, the GPS subsystem often remains in OFF mode until user or network inputs require e.g. turning GPS ON to acquire a location. There is therefore some benefit in allowing the cellular subsystem to provide its own reference clock to the GPS subsystem so the (adjusted) cellular reference clock can be used to quickly calibrate the GPS reference clock.

One or more similar issues may arise when considering other combinations of wireless subsystems or transceivers generally, e.g. if a second transceiver subsystem such as Wi-fi, Bluetooth or other transceiver is to be calibrated with reference to a first transceiver subsystem such as the cellular baseband.

The disclosure seeks to improve the level of accuracy and/or speed when calibrating a second transceiver subsystem based on a first transceiver subsystem by placing the first transceiver subsystem in an appropriate mode during calibration.

As noted above, an apparatus is disclosed. In embodiments of the apparatus, the first mode may be an idle mode in which the first transceiver performs calibrations of the first clock relative to the wireless network, but less often than in the second mode.

The second mode may be a network scan mode in which the first transceiver does not communicate user data with the network, but performs the at least one additional calibration of the first clock by scanning the wireless network.

The first transceiver may also be operable in one or both of a third mode being a dedicated mode used to make voice calls or communicate user traffic in packet form over the wireless network, and a fourth mode being a cell reselection mode in which one or more calibrations of the first clock relative to the wireless network are also performed.

In the first mode the first transceiver may perform calibrations of the first clock relative to the wireless network by listening for paging activity from the wireless network.

In the second mode the first transceiver may be arranged to perform the at least one additional calibration of the first clock relative to the wireless network by inferring frequency information from a signal received over the wireless network.

In the second mode the first transceiver may perform calibrations of the first clock relative to the wireless network at an increased rate compared to the first mode.

In the second mode the first transceiver may perform calibrations of the first clock relative to the wireless network ≥10000 times per second.

In the first mode the first transceiver may perform calibrations of the first clock relative to the wireless network once every 0.47 to 5.12 seconds.

In the second mode the first transceiver may be configured to provide the response signal to the second transceiver until receipt of a further signal from the second transceiver, and the second transceiver may be configured to send the further signal to the first transceiver following calibration of the second clock based on the response signal.

The second mode may be configured to return to the first mode upon receipt of the further signal.

Each of the first and second clocks may comprise a crystal oscillator arranged to generate a respective oscillating reference signal, and each of the calibrations may comprise calibrating a respective clock signal derived from the respective oscillating reference signal.

The first clock may be a digitally compensated oscillator arranged to be calibrated relative to the wireless network, rather than being a temperature compensated oscillator.

The first transceiver may comprise a baseband subsystem and the wireless cellular network may comprise a wireless cellular network.

The second transceiver may be arranged to communicate wirelessly other than by said wireless network.

The second transceiver may comprise a satellite positioning subsystem. The second transceiver may comprise one of a GPS subsystem and a GLONASS subsystem.

The second transceiver may comprise a non-cellular transceiver subsystem for forming ad hoc wireless connections with other devices. The second transceiver may comprise a Bluetooth subsystem.

The second transceiver may comprise a subsystem for communicating with a wireless access point to another network. The second transceiver may comprise a wi-fi subsystem.

Additionally, a mobile user terminal comprising an apparatus is disclosed. In different embodiments, the apparatus can have any of the above features.

In embodiments, the second transceiver may be configured to power up and send said request signal when triggered by a request for use of the second transceiver by a user of the user terminal.

The second transceiver may comprise a satellite positioning subsystem and the second clock may be used to acquire a location of the mobile terminal.

The second transceiver may comprise a satellite positioning subsystem, and the second transceiver may be configured to power up and send said request signal when triggered by a request by a user of the mobile user terminal for use of the satellite positioning subsystem to acquire a location of the mobile user terminal.

A method of operating an apparatus is also disclosed. In embodiments, the method may further comprise operations in accordance with any of the above apparatus features.

A computer program product is also provided herein. In embodiments, the code may be further configured to perform operations in accordance with any of the above method or apparatus features.

FIG. 1 is a schematic illustration of a communication system comprising a mobile user terminal 2 such as a mobile phone, tablet or laptop computer for communicating with a wireless cellular network e.g. operating according to one or more 3GPP radio access technologies. The wireless cellular network comprises a plurality of base stations (node Bs in 3GPP terminology) serving cells of the wireless cellular network. The wider communication system also comprises one or more satellites 10, one or more other devices 8 such as other user terminals or audio play-out devices, and/or one or more wireless access points 6 for accessing another network such as the Internet.

The mobile terminal 2 comprises a processor in the form of a central processing unit (CPU) 22 having one or more execution units. The mobile terminal 2 also comprises a memory 24, a first wireless transceiver in the form of a cellular baseband subsystem 14, and a group of one or more second transceivers in the form of a satellite positioning subsystem such as a GPS subsystem 20 or GLONASS subsystem, a short-range transceiver such as Bluetooth transceiver 18 for forming ad hoc connections with other devices, and a short-range transceiver such as a Wi-fi transceiver 16 for communicating with one or more wireless access points, e.g. to access the Internet. Each of the memory 24 and transceivers 14,16,18,20 is operatively coupled to the CPU 22 by a suitable interconnect 12.

Each of the transceivers 14,16,18,20 may be implemented in the form of a subsystem comprising a combination of dedicated hardware circuitry and software arranged for execution on the CPU 22 and/or a local processor of the subsystem. The dedicated hardware comprises at least a respective clock in the form of a crystal oscillator and associated circuitry, as well as a suitable antenna and any other front-end hardware. Thus the first transceiver (cellular baseband in the example of FIG. 1) comprises a first clock comprising a first crystal oscillator, and each of the one or more second transceivers in question may comprise a respective second clock comprising a respective second crystal oscillator. Each oscillator outputs a respective oscillating reference signal which is converted to a digital signal to be calibrated.

The memory 24 comprises one or more internal and/or external storage media such as magnetic or electronic storage devices, storing wireless communication code and calibration code arranged for execution on the CPU 22 and/or any local processor of the relevant transceiver 14, 16, 18 and/or 20. When executed the wireless communication code operates the mobile user terminal 2 to communicate over the wireless cellular network via the cellular baseband 14 and one or more of the base stations 4, e.g. to conduct voice calls and/or send user traffic in packet form such as to send emails or access the web over the cellular network. The wireless communication code also operates the GPS subsystem 20 to communicate with one or more of the satellites 10 to acquire a position of the mobile terminal 2, and/or operates the Wi-fi subsystem 16 to communicate with one or more of the wireless access points 6 to access the Internet, and/or operates the Bluetooth subsystem 18 to communicate with one or more of the other devices 8 e.g. to share media between peers or play out voice or other audio from an audio device.

The first clock is used to time the wireless communications performed via the first transceiver (baseband 14 in FIG. 1). Each of the one or more second clocks is used to time the wireless communications performed via the respective one of the one or more second transceivers (GPS 20, Bluetooth 18 and/or Wi-fi 16 in FIG. 1).

The calibration code is configured to perform operations to calibrate the clock of one or more of the second transceiver subsystems 16, 18, 20 in accordance with the example embodiments of the invention set out below.

The baseband subsystem 14 comprises a mechanism that may be referred to as automatic frequency control (AFC), by which it calibrates its own clock (the first clock) relative to the wireless cellular network. This is achieved by measuring the baseband's local clock frequency (derived from its main crystal) and comparing it against a signal from the network that is generated at a known frequency. The frequency is inferred from the network. In 3G for example the PCH, FACH, DCH channels can each be used to adjust the local reference clock through the AFC algorithm. The baseband 14 is thus able to remain synchronised in its communications with the network.

According to embodiments of the disclosure the clock of the baseband subsystem 14, having been calibrated relative to the wireless cellular network, is then used to calibrate one of the clocks of the GPS, Bluetooth and/or Wi-fi subsystems.

In one example the GPS chip uses a reference clock signal provided from the cellular baseband 14 to calibrate its own crystal. For this to work efficiently, in certain applications the baseband reference clock needs to be at least 0.3 ppm accurate (though other constraints may apply to other designs). The purpose of the following embodiments is to guarantee that level of accuracy by placing the baseband 14 in the appropriate mode during calibration.

Besides, as mentioned, while the cellular baseband subsystem 14 is normally continuously adjusting its own reference clock, the GPS subsystem often remains in OFF mode until user or network inputs require e.g. turning GPS ON to acquire a location. There is therefore another benefit in allowing the cellular subsystem 14 to provide its own reference clock to the GPS subsystem 20 so the (adjusted) cellular reference clock can be used to quickly calibrate the GPS reference clock.

The following is exemplified in terms of the cellular to GPS calibration path, but the invention may apply equally to other paths, such as calibrating the Wi-fi and/or Bluetooth clocks based on the cellular clock. In the particular case of GPS the purpose of clock calibration is to improve the Time To First Fix (i.e. time it takes to acquire a first location). Additionally, clock calibration can make it possible to acquire a location under noisy conditions where it would normally not be possible to synchronize with satellites.

Figure 2:
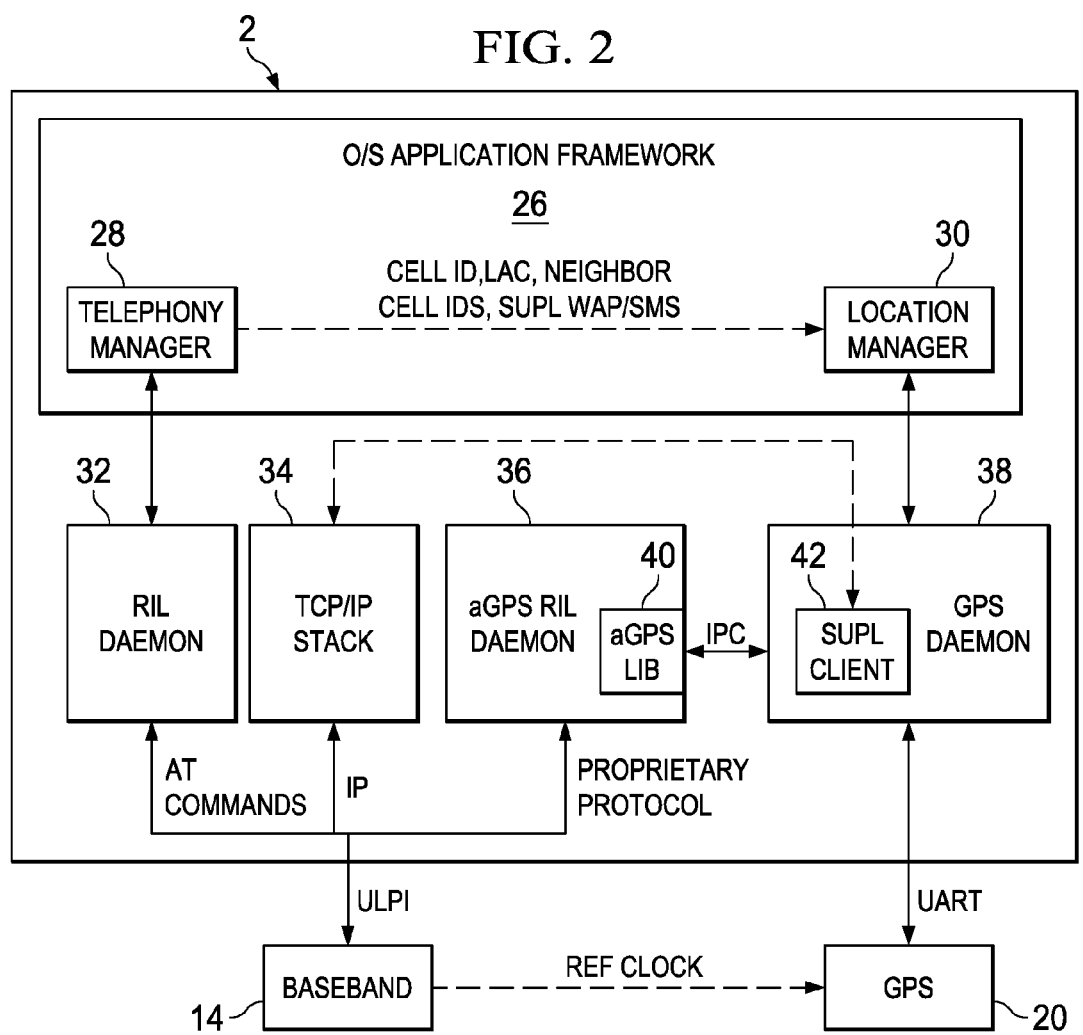
FIG. 2 is a schematic block diagram of an embodiment of a mobile user terminal.

On the mobile terminal 2 there is provision for hardware signals and a software handshake mechanism to make this process possible. This is illustrated schematically in FIG. 2.

The mobile terminal 2 comprises an operating system 26 providing a framework for running applications such as a telephony manager 28 for performing voice calls over the cellular network via resource interface layer (RIL) daemon 32, and a location manager 30 for controlling the GPS 20 to perform positioning operations to acquire a location of the mobile terminal 2 via GPS daemon 38 (comprising SUPL client 42) and assisted GPS (aGPS) RIL daemon 36 (comprising assisted GPS library 40). Other applications may communicate packet data via the baseband 14 and cellular network via TCP/IP stack 34. (The telephony manager 28, RIL daemon 32 and TCP/IP stack 34 may be considered to be comprised by the software side of the subsystem forming the baseband transceiver 14, but are expanded here for illustrative purposes. Similarly the location manager 30 and GPS daemons 36, 38 may be considered to be comprised by the software side of the subsystem forming the GPS transceiver 20.)

The baseband subsystem 14 is configured to provide frequency information in the form of a reference clock signal (REF CLOCK) to the GPS subsystem 20 (or another one of the second transceivers). This reference clock is, or is based on, the clock signal of the baseband oscillator having been calibrated relative to the cellular network by the AFC mechanism described above. In embodiments this reference clock signal may be provided by a hardware path.

The telephony manager 28 may be operable to communicate with the location manager 30 via a software mechanism of the operating system application framework 26. The RIL daemon 32 may be operable to communicate with the aGPS RIL daemon 36 via, and the GPS daemon 38 may be configured to communicate with the aGPS RIL daemon, a lower level software mechanism. These communication paths enable a software handshake message for implementing embodiments of the disclosure. Particularly, the GPS subsystem 20 is arranged to request that the baseband subsystem 14 transitions to a preferred mode for calibrating the baseband clock before the reference clock signal (REF CLOCK) then provided on for calibration of the GPS subsystem's own clock. The exact paths illustrated are not essential, but in some embodiments the idea is to provide a hardware signal from baseband to GPS (or the like) to convey the reference clock, and additionally a software mechanism for the control side of calibration. The software mechanism allows for calibration to be started and stopped and also provides feedback from baseband to GPS in order to let the GPS subsystem know whether the reference clock was deemed stable during the whole calibration process.

The process of providing the reference clock from the baseband 14 to another of the subsystems may be referred to as clock aiding, or GPS clock calibration, and works as follows:

i. When the GPS chip boots up, it requests the cellular reference clock through a software handshake mechanism;
ii. The cellular subsystem 14 then enables its reference clock output to the GPS chip;

iii. The GPS chip uses the adjusted cellular reference clock to calibrate its own crystal (in certain implementations this takes approximately 2 seconds);

iv. The GPS chip instructs the cellular subsystem 14 to stop providing the reference clock.

Clock aiding works best if the cellular reference clock is relatively very accurate (typically less than 0.3 ppm drift).

At any point in time, the baseband 14 may be in one of the following states—ordered by increasing accuracy of the cellular reference clock.

No service: in this mode, there is no possible adjustment of the reference clock to the network clock. The accuracy of the reference clock is unknown and depends on the characteristics of the crystal. If the crystal is a TCXO (temperature compensated crystal oscillator) there will be a typical +/−7 ppm initial drift (crystal dependent) plus up to +/−3 ppm drift due to temperature. If the crystal is a DCXO (digitally compensated crystal oscillator), there will be a typical +/−7 ppm initial drift plus up to +/−9 ppm drift due to temperature.

Out Of coverage (OOC): this event will induce a potentially significant frequency drift. Should this occur during calibration, the baseband 14 should report that it was not possible to enforce a stable reference clock.

Idle Mode: in idle mode, the baseband 14 monitors and adjusts (through automatic frequency control—AFC) the frequency of the crystal during every paging activity. Under typical network conditions, paging activities occur every 0.5 to 1.28 seconds. In the worst case, if the baseband 14 was engaged in a data call before entering idle, the temperature will drop quickly. If the crystal is a TCXO, the crystal will automatically adjust and cause the reference clock to stay within acceptable range of the targeted frequency. If the crystal is a DCXO, adjustments only occur during paging activities; the frequency drift following a temperature drop is expected to be in the order of hundreds of ppb per second.

Cell reselection: cell towers 4 normally have a very low frequency offset with respect to each other. There may be a small Doppler shift associated with the transition from one cell to another; however this should be small enough to consider the reference clock stable.

Dedicated mode (voice/data call): refers to a mode where the mobile equipment is assigned a dedicated channel to communicate in the uplink direction. In this mode, the baseband runs the AFC at a rate of up to 15 kHz. In this mode, the reference clock will follow the targeted frequency very closely and the drift will be well within 0.1 ppm.

The AFC runs when decoding PCH, DCH, FACH channels so the adjustment period depends on the baseband state. It will be relatively infrequent in idle mode compared to the dedicated mode In idle mode the period is between ~0.5 and ~2 seconds depending on the network configuration (the most extreme paging intervals are 0.47 s for 2G-DRX2 and 5.12 s for 3G-DRX9), whereas in dedicated mode the rate may be up to 15 kHz.

As an additional issue, when the mobile moves relative to the base station, the Doppler effect induces a shift on the frequency of the base station signal (seen from the mobile point-of-view). The magnitude of the Doppler effect depends on the speed of the mobile, relative to the base station 4, as shown in the below table:

| Speed (km/h) | Speed (mph) | Expected shift on ref clock (ppm) |
|---|---|---|
| 0 | 0 | 0 |
| 30 | 18 | 0.025 |
| 60 | 37 | 0.05 |

A potential problem with clock aiding is that the GPS chip expects the cellular reference clock to have a certain accuracy, e.g. to be at least 0.3 ppm accurate, ideally 0.1 ppm. If the cellular reference clock exceeds the maximum allowed drift then clock aiding becomes counterproductive as in the case of the GPS chip it will take longer to synchronize with satellites than it would normally take without clock aiding.

However, in some implementations, this 0.3 ppm accuracy can only be achieved if the baseband 14 is in dedicated mode (the constraint may vary in other implementations). This is a problem since the baseband 14 typically spends more than 90% of its time in idle mode. If no specific action is taken the cellular reference clock will likely exceed the maximum allowed drift 90% of the time thus making clock aiding very inefficient or unreliable.

In the example of FIG. 1 the invention comprises placing the cellular subsystem 14 into a better mode for calibration, ideally placing the cellular subsystem 14 in the best possible mode to guarantee maximum accuracy of the cellular reference clock when GPS clock calibration is running.

This applies especially (but not necessarily exclusively) to the idle mode which is the normal state of the cellular system 14 (usually more than 90% of the time is spent in idle mode). The idea is to artificially switch the baseband 14 to a mode that provides better reference clock precision when there is a request to provide a reference clock in idle mode. The clock accuracy requirements will be met if the baseband turns its receiver ON to decode network information every tens of milliseconds instead of every second as it is normally approximately the case in Idle Mode. This is particularly important when the baseband subsystem uses a DCXO—which now tends to be the norm since DCXOs cost less than their TCXO counterparts.

In embodiments, the mode to which the baseband subsystem 14 switches may be considered a variant of the idle mode where it additionally scans the network by reading from one or more neighbor cells, as opposed to just listening for paging activity. This may be referred to herein as a network scan mode. This mode may be neither a true idle mode where the mobile equipment only listens for paging activities, nor a dedicated mode where the baseband is communicating user data with the network (e.g. calls or Internet access). In the network scan mode the mobile equipment actively performs a network scan (e.g. a background PLMN search) in which it decodes data from the network to perform additional calibrations of the baseband clock, e.g. decoding data from a pilot channel, control channel or other channel of the network apart from just a paging channel. In embodiments this may be done periodically, and more often than in the idle mode. So in the network scan mode, the baseband 14 may be idle in terms of user activity, but additionally performing a background scan such as a PLMN (public land mobile network) search. In some embodiments of the network scan mode the baseband may run the AFC at a frequency of at least 10 times per second. In this mode the reference clock will follow the targeted frequency very closely and the drift will be well within 0.1 ppm.

With this modification to the reference clock supply scheme the cellular reference clock can be provided at the requested accuracy close to 100% of the time (assuming the mobile 2 is properly registered to the network, this does not hold if there is no cellular network coverage).

Figure 3:
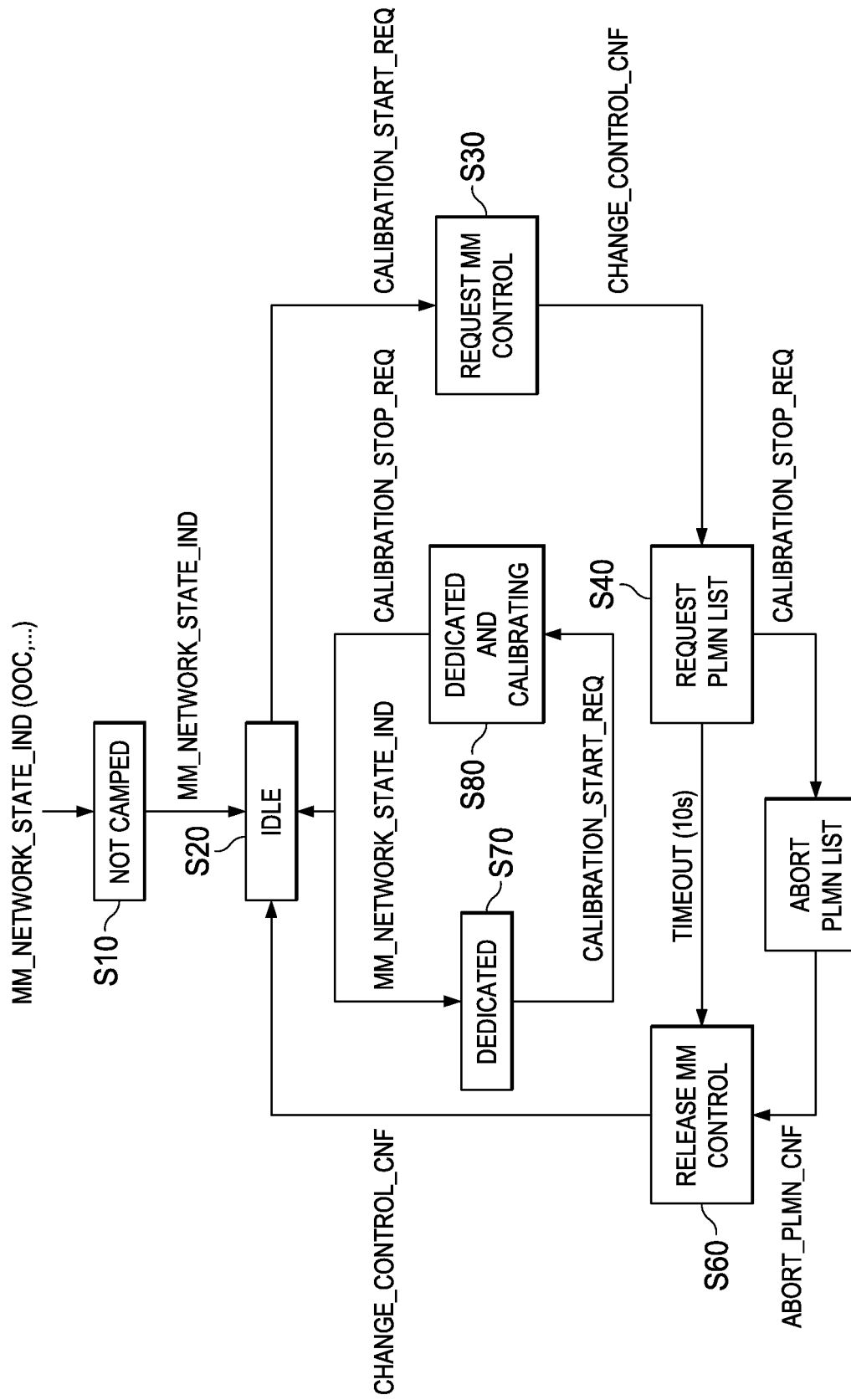
FIG. 3 is a state diagram of an embodiment of a clock calibration process.

An exemplary implementation of the invention may be achieved based on a finite state machine as depicted in FIG. 3.

At state S10 the mobile 2 is not camped on any cell. At state S20 the mobile 2 then connects to a cell but camps on the cell in idle mode. At state S30 the GPS subsystem 20 requests that the baseband 40 switched to the network scan mode.

The GPS subsystem 20 sends a CALIBRATION START REQ signal. In response the baseband 14 enters state S40 and sends an internal signal to the protocol stack. Upon reception of a positive response, the baseband software enters state S40 and sends a positive response to the GPS subsystem 20 to let it know calibration can be started. In this example the network scan (and AFC to steer modem clock to +/−0.3 ppm) starts from S40. A 10-second timer is then started. The baseband 14 will stop the network scan process after 10 seconds (enters state S60), or when it gets the CALIBRATION STOP REQ message from the GPS subsystem 20 (in that case, enters state S50 to stop network scan before the 10 second timer expiration). In either case, in state S60 the baseband 14 sends an internal message to the protocol stack to stop controlling the network scan. Control of MM (mobility management) is usually from the upper layers and typically a network scan is started from a user action on the phone (user interface, via an AT command (e.g. from telephony manager 28 to RIL daemon 32 to baseband 14). Note: this mechanism and the details of FIG. 2 may apply for one or more particular operating systems. On other operating systems, this clock calibration principle may still apply but the details of FIGS. 2 and 3 may be different.

In response to the request, at state S70 the baseband 14 switches from idle mode to the dedicated mode. At state S80 the baseband begins calibrating its own clock relative to the cellular network, and based on the calibration providing the reference clock to the GPS subsystem 20. This continues until the baseband 14 receives a stop request from the GPS subsystem, at which point the baseband 14 returns to the idle state S20.

In order to limit the potential impact of the reference clock supply algorithm on the rest of the protocol stack it was found that one way is to perform a network scan (REQUEST_PLMN_LIST) when a request to start GPS clock calibration (CALIBRATION_START_REQ) is received in idle mode. Indeed network scans are background activities typically involving only the receiving side of the transceiver and they are automatically preempted by any higher priority task (on either control or signal planes).

An alternative to the above scheme may be to bypass GPS clock calibration. However this will result in longer Time To First Fix (more power, degraded user experience) or inability to synchronize with satellites. Another alternative would be to use a better crystal (e.g. high-precision TCXO), but these crystals are more expensive. Another alternative would be to leave the baseband in idle mode during GPS clock calibration. However, in that case the cellular clock accuracy would be unpredictable and would depend on temperature conditions, resulting in erratic behaviour. Yet another alternative would be forcing the GPS application to make a call (IP traffic) during GPS clock calibration. However, it would be difficult to synchronize call and reference clock supply, and there would be a significant waste of power due to uplink activity. Hence the described scheme is considered to be advantageous compared with these alternatives.

It will be appreciated that the above embodiments have been described only by way of example. Other variants may be realised by a person skilled in the art given the disclosure herein. The disclosure is not limited by the described embodiments but only by the accompanying claims.

The invention claimed is:

1. Apparatus comprising:
a first transceiver arranged to communicate over a wireless network, the first transceiver comprising a first clock; and
a second transceiver arranged to communicate other than by said wireless network, the second transceiver comprising a second clock;
wherein the second transceiver is configured to send a request signal to the first transceiver;
the first transceiver is configured, in response to the request signal, to transition from a first mode to a second mode and provide to the second transceiver a response signal for calibrating the second clock relative to the first clock, wherein in the first mode the first transceiver performs zero or more calibrations of the first clock relative to the wireless network, and in the second mode the first transceiver performs at least one additional calibration of the first clock relative to the wireless network, the response signal being based on the at least one additional calibration; and
the second transceiver is configured to calibrate the second clock based on the response signal.

2. The apparatus of claim 1, wherein the first mode is an idle mode in which the first transceiver performs calibrations of the first clock relative to the wireless network, but less often than in the second mode.

3. The apparatus of claim 2, wherein the second mode is a network scan mode in which the first transceiver does not communicate user data with the network, but performs the at least one additional calibration of the first clock by scanning the wireless network.

4. The apparatus of claim 1, wherein the first transceiver is also operable in one or both of a third mode being a dedicated mode used to make voice calls or communicate user traffic in packet form over the wireless network, and a fourth mode being a cell reselection mode in which one or more calibrations of the first clock relative to the wireless network are also performed.

5. The apparatus of claim 1, wherein in the first mode the first transceiver performs calibrations of the first clock relative to the wireless network by listening for paging activity from the wireless network.

6. The apparatus of claim 1, wherein in the second mode the first transceiver is arranged to perform the at least one additional calibration of the first clock relative to the wireless network by inferring frequency information from a signal received over the wireless network.

7. The apparatus of claim 1, wherein in the second mode the first transceiver performs calibrations of the first clock relative to the wireless network at an increased rate compared to the first mode.

8. The apparatus of claim 1, wherein in the second mode the first transceiver performs calibrations of the first clock relative to the wireless network>10000 times per second.

9. The apparatus of claim 1, wherein in the first mode the first transceiver performs calibrations of the first clock relative to the wireless network once every 0.47 to 5.12 seconds.

10. The apparatus of claim 1, wherein in the second mode the first transceiver is configured to provide the response signal to the second transceiver until receipt of a further signal from the second transceiver, and the second transceiver is configured to send the further signal to the first transceiver following calibration of the second clock based on the response signal.

11. The apparatus of claim 10, wherein the second mode is configured to return to the first mode upon receipt of the further signal.

12. The apparatus of claim 1, wherein each of the first and second clocks comprises a crystal oscillator arranged to generate a respective oscillating reference signal, and each of the calibrations comprises calibrating a respective clock signal derived from the respective oscillating reference signal.

13. The apparatus of claim 1, wherein the first clock is a digitally compensated oscillator arranged to be calibrated relative to the wireless network, rather than being a temperature compensated oscillator.

14. The apparatus of claim 1, wherein the first transceiver comprises a baseband subsystem and the wireless cellular network comprises a wireless cellular network.

15. The apparatus of claim 1, wherein the second transceiver is arranged to communicate wirelessly other than by said wireless network.

16. The apparatus of claim 1, wherein the second transceiver comprises a satellite positioning subsystem.

17. The apparatus of claim 16, wherein the second transceiver comprises one of a Global Positioning System ,GPS and a Global Navigation Satellite System GLONASS.

18. The apparatus of claim 1, wherein the second transceiver comprises a non-cellular transceiver subsystem for forming ad hoc wireless connections with other devices.

19. The apparatus of claim 18, wherein the second transceiver comprises a Bluetooth® subsystem.

20. The apparatus of claim 1, wherein the second transceiver comprises a subsystem for communicating with a wireless access point to another network.

21. The apparatus of claim 20, wherein the second transceiver comprises a wi-fi® subsystem.

22. A mobile user terminal comprising the apparatus of claim 1.

23. The mobile user terminal of claim 22, wherein the second transceiver is configured to power up and send said request signal when triggered by a request for use of the second transceiver by a user of the user terminal.

24. The mobile user terminal of claim 22, wherein the second transceiver comprises a satellite positioning subsystem and the second clock used to acquire a location of the mobile terminal.

25. The mobile user terminal of claim 23, wherein the second transceiver comprises a satellite positioning subsystem, and the second transceiver is configured to power up and send said request signal when triggered by a request by a user of the mobile user terminal for use of the satellite positioning subsystem to acquire a location of the mobile user terminal.

26. A method of operating an apparatus comprising a first transceiver arranged to communicate over a wireless network and a second transceiver arranged to communicate other than by said wireless network, the first transceiver comprising a first clock and the second transceiver comprising a second clock; the method comprising:

sending a request signal from the second transceiver to the first transceiver;

in response to the request signal, transitioning the first transceiver from a first mode to a second mode and providing from the first transceiver to the second transceiver a response signal for calibrating the second clock relative to the first clock, wherein in the first mode the first transceiver performs zero or more calibrations of the first clock relative to the wireless network, and in the second mode the first transceiver performs at least one additional calibration of the first clock relative to the wireless network, the response signal being based on the at least one additional calibration; and calibrating the second clock based on the response signal.

27. A computer program product for operating an apparatus comprising a first transceiver arranged to communicate over a wireless network and a second transceiver arranged to communicate other than by said wireless network, the first transceiver comprising a first clock and the second transceiver comprising a second clock; the computer program product being embodied on a non-transitory computer readable storage and configured so as when executed on one or more execution units of said apparatus to perform operations of:

sending a request signal from the second transceiver to the first transceiver;

in response to the request signal, transitioning the first transceiver from a first mode to a second mode and providing from the first transceiver to the second transceiver a response signal for calibrating the second clock relative to the first clock, wherein in the first mode the first transceiver performs zero or more calibrations of the first clock relative to the wireless network, and in the second mode the first transceiver performs at least one additional calibration of the first clock relative to the wireless network, the response signal being based on the at least one additional calibration; and calibrating the second clock based on the response signal.

* * * * *